Dec. 16, 1958   J. C. BANDLI ET AL   2,864,349
INTAKE MANIFOLD FOR INTERNAL COMBUSTION ENGINES
Filed Sept. 25, 1957   2 Sheets-Sheet 2

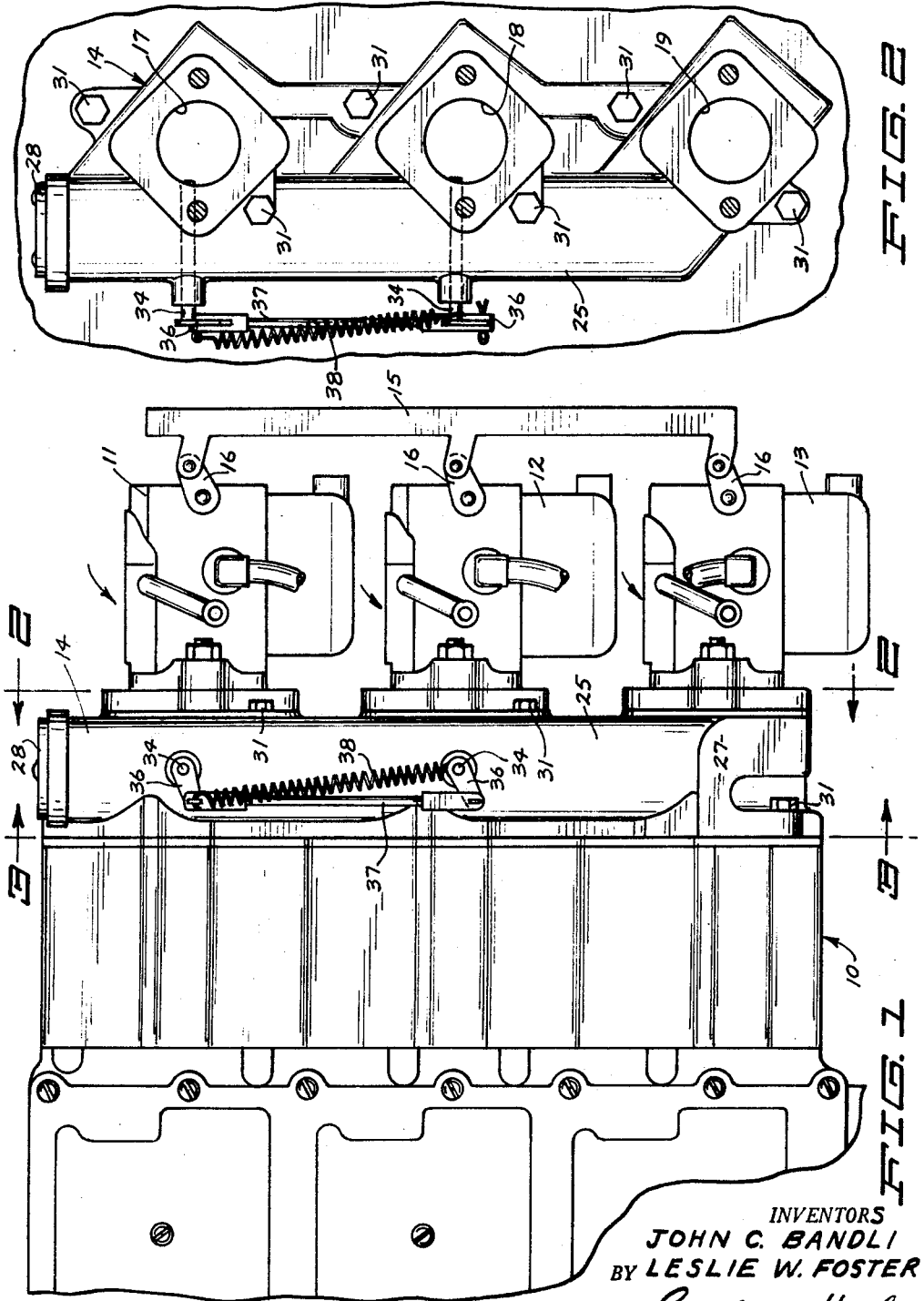

INVENTORS
JOHN C. BANDLI
BY LESLIE W. FOSTER

ATTORNEYS

United States Patent Office 2,864,349
Patented Dec. 16, 1958

2,864,349

INTAKE MANIFOLD FOR INTERNAL COMBUSTION ENGINES

John C. Bandli and Leslie W. Foster, Minneapolis, Minn., assignors, by mesne assignments, to McCulloch Corporation, Los Angeles, Calif., a corporation of Wisconsin Application September 25, 1957, Serial No. 686,229

5 Claims. (Cl. 123—52)

This invention relates generally to internal combustion engines and more particularly concerns a fuel induction system and manifold for engines having vertically stacked cylinders for operating a vertical drive shaft such as in an outboard motor.

The primary object of the invention is to provide a novel intake manifold for an engine having a plurality of vertically aligned, axially horizontal cylinders which is adapted to provide an independent fuel system for each cylinder at low engine speeds and to combine said systems for increased fuel intermixture at high engine speeds.

Another object of the invention is to provide an intake manifold for carrying combustible gases to a plurality of vertically aligned cylinders which assures vertical separation for equal distribution of the gases to all cylinders at low engine speeds and which in so doing traps the heavy unconsumed portions of the fuel adjacent each cylinder so as to prohibit said portions from accumulating at the bottom of the manifold.

It will be readily understood that the problem of providing the correct fuel mixture to all cylinders in an engine having a vertical drive shaft driven from vertically stacked cylinders is a particularly acute one. This is due to the fact that at low speeds there is normally inadequate suction within the intake manifold to prevent gravitational forces from interfering with the vertical distribution. This is particularly true where relatively heavy fuel mixtures are used, such as in the case of outboard motors, where oil is mixed with the gasoline for best engine performance. It is with this problem that the present invention is concerned.

The invention broadly comprises a fuel induction system for a multi-cylinder internal combustion engine having the cylinders on horizontal axes and in vertical alignment, an elongated upright intake manifold mounted on the engine, said manifold having a plurality of interior chambers spaced therealong each in open communication with one of said cylinders, the manifold having a plurality of inlet ports each communicating with one of said chambers, means adjacent each inlet port for mounting a carburetor on the manifold whereby there is an independent carburetor for each chamber and its interconnecting port so that fuel may pass directly from the carburetor to the cylinder through the corresponding port and chamber of the manifold, said manifold having an internal vertical passageway interconnecting all of said chambers, valve means mounted in the passageway between next adjacent chambers for opening and closing the passageway, a single control means for simultaneously operating the valve means between open and closed positions, a throttle means for increasing and decreasing the speed of the engine, and said control means connected to the throttle means for moving the valve means in a closing direction as engine speed is decreased and in an opening direction as the engine speed is increased.

The above mentioned and still additional objects of the invention will be brought to light during the course of the following specification, reference being made to the accompanying drawings, in which Fig. 1 is a side elevation of the improved manifold incorporated in a fuel induction system of an outboard motor.

Fig. 2 is a front elevation of the manifold as viewed along line 2—2 of Fig. 1.

Figures 3, 4:
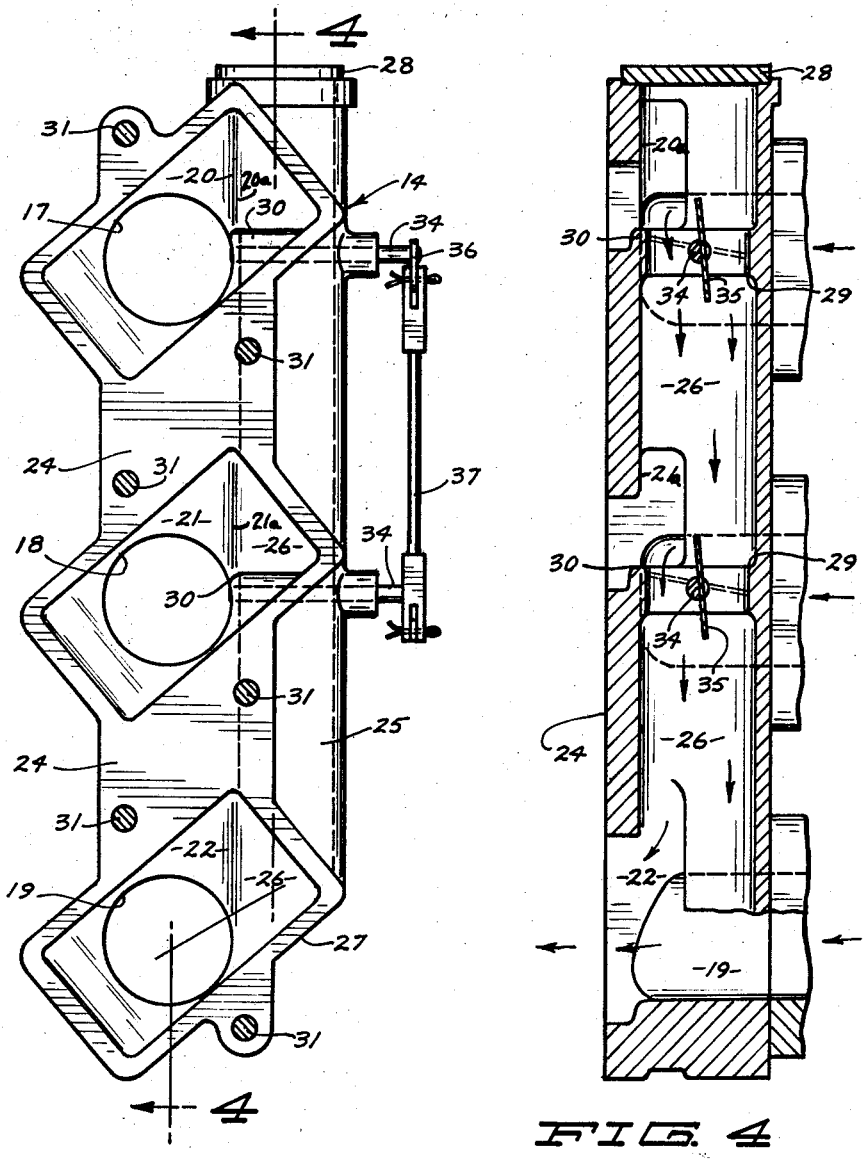
Fig. 3 is a rear elevation of the manifold as viewed along line 3—3 of Fig. 1.
Fig. 4 is a vertical section through the manifold taken along line 4—4 of Fig. 3.

Referring now more particularly to the drawings reference numerals will be used to denote like parts or structural features in the different views. Fig. 1 shows one side of the powerhead 10 of an outboard motor having three vertically aligned cylinders which lie on horizontal axes. The numbers 11, 12 and 13 indicate three identical carburetors each connected to the powerhead through an upright intake manifold 14. A single control arm 15 has connection with fuel supply levers 16 to regulate the gasoline supply to the carburetors 11, 12 and 13. Thus all three carburetors are synchronously regulated by arm 15.

The construction of the intake manifold 14 forms the principal subject matter of the present invention. The manifold is preferably formed of a single casting. For convenience of description the powerhead or left side of the manifold as viewed in Fig. 1 will be referred to as the rear side while the carburetor or right side of the manifold as viewed in Fig. 1 will be referred to as the front side. The front side of the manifold is provided with three vertically spaced inflow ports 17, 18, and 19 (Fig. 2) which respectively provide an open connection between carburetors 11, 12 and 13 and the manifold for carrying combustible gases into the manifold. The manifold has a forwardly projecting mounting collar surrounding each port and to which the carburetor is attached. The manifold is provided with three vertically spaced chambers denoted at 20, 21 and 22 (Fig. 3) which open rearwardly through a flat rear surface 24 on the manifold. Chamber 20 and port 17 accordingly provide a continuous generally horizontal passageway for combustible gases from carburetor 11 into the top cylinder of the engine. The other openings and chambers provide identical passageways from carburetors 12 and 13 into the center and bottom cylinders of the engine.

Manifold 14 is provided with an integral tube-shaped valve housing portion 25 (Fig. 3) which provides a vertical passageway 26 through the manifold at one side of the chambers 20, 21 and 22. The internal design of passageway 26 can best be observed in Figs. 3 and 4. The lower end of the manifold portion 25 is closed by wall 27 while the upper end is closed by cap 28. Passageway 26 is openly exposed to each of the chambers 20, 21 and 22. Accordingly, the chambers are normally in open communication with each other through the passageway 26.

There are two diametrically reduced sections along the passageway 26 which are denoted at 29 opposite each of the two upper chambers 20 and 21. The rear wall of these sections is provided by the lip portions 30 which project upwardly within the chambers 20 and 21. The openings from the passageway into chambers 20 and 21 are located above the lips 30 and are designated respectively at 20a and 21a.

The casting is tapped from front to rear at various points along its length to receive bolts 31 which secure the manifold to the engine block 10.

A pair of valve shafts 34 are journaled transversely for rotation in the walls of the tube portion 25 at each of the sections 29. Each shaft 34 carries within the passageway 26 a disk-shaped butterfly valve 35 adapted to close the reduced portion 29 of the passageway.

Each shaft carries a crank arm 36 extending rearwardly outside of the manifold (Fig. 1) and these arms are interconnected by a rigid link 37. A coil spring 38 is connected under tension between the lower shaft 34 and the upper end of link 37 to yieldably retain the arms 36 in their rearwardly extending position. When the arms are in such position the valve disks 35 are closed crosswise of the passageway 26 as shown in broken lines in Fig. 4. The link 37 is suitably connected to a throttle control (not shown) whereby as the control is moved in a speed increasing direction the link 37 will be raised to rotate shafts 34 in a valve opening direction. Accordingly, when the engine is at full speed the valves 35 will be in the open substantially vertical position shown in full lines in Fig. 4.

Operation of the invention will now be understood. During low speeds and idling of the engine the valves 35 will be held in closed condition under tension exerted by spring 38. Chambers 20, 21 and 22 are accordingly isolated from one another and each of the carburetors 11, 12 and 13 will supply fuel respectively through inlets 17, 18, and 19 and chambers 20, 21 and 22 to only one cylinder of the engine. Inasmuch as the carburetors are of the relatively small throat high velocity type this arrangement gives most efficient engine operation at relatively low and idle speeds.

It is important to note that in the upper chambers 20 and 21, the bottom of the chambers forms a V-shaped pocket and that these pockets lie substantially below the lower edges of openings 20a and 21a from the respective chambers into the passageway 26. The raised lips formed at 30 form the bottom edge of said openings. This feature of construction forms a trap which prohibits the overflow from the chamber of the heavy ends or least volatile fuel portions which tend to settle in the chamber bottom during low speeds. Eliminating the feature such heavy ends particularly present in outboard motor fuel mixtures would flow through passageway 26 and accumulate in the bottom chamber 19 decreasing the efficiency of the lowermost cylinder.

As engine speed is increased the throttle control connected to link 37 will cause the valves 35 to open until they are brought to a wide open position at full throttle. This allows each cylinder to draw from all three carburetors on the intake stroke, with the fuel passing through passage 26. In Fig. 4 the direction of fuel vapor flow when the lowermost cylinder is drawing as indicated by the arrows.

Due to the increased breathing capacity created by interconnection of all of the carburetors the distribution at wide open throttle is very good in spite of the vertical arrangement of the cylinders. Also by tying the carburetors together through passageway 26 fuel flying back from the intake valves is pulled into the next cylinder. Accordingly the construction has all of the advantages of individual carburetors at low speed without carrying over the disadvantages in such a system at high speed.

It is significant that the manifold construction performs with considerable effectiveness even when valves are not used in passageway 26. Vertical separation is maintained to a certain degree at low speeds due to the relatively low suction causing each cylinder to draw primarily from its aligned carburetor. The greater suction in the manifold created by increased engine speed, however, causes the fuel from all carburetors to thoroughly intermix in the manifold before being drawn into the cylinders. While use of the valves provides even greater effectiveness of operation it does present an added cost which can in certain applications of the invention be eliminated.

The concept embodied in the invention can also be utilized effectively where multiple engine cylinders are arranged in vertically spaced pairs with individual carburetors supplying fuel to each pair of cylinders.

The manifold described accordingly provides an improved system of fuel distribution to vertically spaced cylinder engines such as outboard motors. It actually provides independent fuel systems for the various cylinders at low speeds and combines the systems at high speeds. Sucessful use of the concept in the vertical type engine is due primarily to the interior design of the manifold which prohibits settlement of the heavier fuel portions to the bottom of the manifold during low speed operation.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. An intake manifold for a multi-cylinder engine having vertically spaced cylinders which comprises an elongated manifold casting adapted to be mounted on the engine in vertical position opposite said cylinders, said casting having a plurality of internal chambers one in open communication through one side of the casting with each of said vertically spaced cylinders, said casting having a plurality of inflow ports each extending from one of said chambers to the opposite side of the casting, carburetor mounting means on the casting adjacent each inflow port, said casting having a vertically extending internal passageway beside said chambers and opening thereto to provide communication therebetween, and the opening between the passageway and each chamber being located substantially above the bottom of said chamber.

2. The subject matter of claim 1 wherein the chambers are shaped so as to have a downwardly tapered pocket at the bottom and the casting having an integrally formed raised lip between the chamber and passage and extending substantially above the pocket bottom to prohibit overflow of heavy liquid components from the pocket into the passageway.

3. An intake manifold for a multi-cylinder engine having three or more cylinders arranged on horizontal axes and in vertical alignment which comprises an elongated unitary casting adapted to be mounted in vertical position on the engine and having a plurality of vertically spaced chambers each with in open communication with one of the engine cylinders, said casting having a fuel inflow port extending from each chamber, means for mounting a carburetor on the casting at each inflow port for supplying fuel through the port and connected chamber to the corresponding cylinder, said casting having an internal vertical passageway disposed alongside the chambers and opening into each chamber, a plurality of valves mounted in the manifold within the passageway and vertically spaced to lie intermediate next adjacent chambers for opening and closing the passageway, a single control means connected to all of the valves for simultaneously opening and closing the valves, and a spring means acting upon the control means to yieldably retain the valves in closed position.

4. An intake manifold construction for a multicylinder engine having vertically spaced cylinders which comprises an elongated manifold adapted to be mounted on the engine in vertical position opposite said cylinders, said manifold having a plurality of vertically spaced internal chambers each of which opens through a side wall of the manifold for open communication with one of said cylinders, said manifold having a plurality of fuel inflow ports leading one to each chamber and a vertically extending internal passageway opening into each of said chambers to provide open communication between the chambers, and the opening between the passageway and each chamber being located substantially above the bottom of said chamber.

5. For use on a multi-cylinder engine having a plurality of vertically spaced cylinders, an elongated intake manifold adapted to be mounted on the engine in vertical position opposite said cylinders and having a plurality of vertically spaced internal chambers adapted for open communication one with each of said engine cylinders, the manifold having a fuel inflow port extending from each chamber for passage of engine fuel through the port and chamber and into the communicating cylinder, said manifold having a vertically extending interior passageway disposed alongside said chambers and opening into each of said chambers, the opening between the passageway and each chamber being located substantially above the bottom of said chamber, a plurality of valve means disposed within the passageway intermediate next adjacent chambers for opening and closing the passageway, and a single control means connected to all of said valve means for synchronous opening and closing thereof.

References Cited in the file of this patent

UNITED STATES PATENTS

| | | |
|---|---|---|
| 1,763,726 | Timian | June 17, 1930 |
| 2,636,486 | Taylor | Apr. 28, 1953 |

FOREIGN PATENTS

| | | |
|---|---|---|
| 195,402 | Great Britain | Dec. 20, 1923 |
| 835,666 | France | Oct. 3, 1938 |